US010064323B2

(12) United States Patent
Hahn et al.

(10) Patent No.: US 10,064,323 B2
(45) Date of Patent: Sep. 4, 2018

(54) AGRICULTURAL IMPLEMENT WITH ELECTRO-HYDRAULIC CYLINDERS

(71) Applicant: KINZE MANUFACTURING, INC., Williamsburg, IA (US)

(72) Inventors: Dustan Hahn, Williamsburg, IA (US); Merlan Rolffs, Pella, IA (US); John P. Mulherin, Cedar Rapids, IA (US); Courtney N. Achen, Iowa City, IA (US); Gary Volz, Williamsburg, IA (US); Steve Nolte, North Liberty, IA (US); Ryan Legge, Cedar Rapids, IA (US); Rhett Schildroth, North Liberty, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days.

(21) Appl. No.: 14/604,268

(22) Filed: Jan. 23, 2015

(65) Prior Publication Data
US 2015/0208571 A1 Jul. 30, 2015

Related U.S. Application Data

(60) Provisional application No. 61/931,256, filed on Jan. 24, 2014.

(51) Int. Cl.
*A01B 71/02* (2006.01)
*F15B 15/18* (2006.01)
(Continued)

(52) U.S. Cl.
CPC .............. *A01B 71/02* (2013.01); *A01B 69/02* (2013.01); *A01B 73/005* (2013.01); *A01C 7/208* (2013.01);
(Continued)

(58) Field of Classification Search
CPC ........ A01B 71/02; F15B 15/088; F15B 15/18; A01C 7/208
(Continued)

(56) References Cited

U.S. PATENT DOCUMENTS 3,860,074 A * 1/1975 Maistrelli ............. F15B 21/087
172/9
4,067,394 A * 1/1978 Deckler ................. A01B 63/10
172/130
(Continued)

FOREIGN PATENT DOCUMENTS

SU 1449040 A1 1/1989
WO 2008107671 9/2008

OTHER PUBLICATIONS

International Searching Authority, "International Search Report", Issued in connection to International Application No. PCT/US2015/012685 dated May 18, 2015.

*Primary Examiner* — John Weiss
(74) *Attorney, Agent, or Firm* — McKee, Voorhees & Sease, PLC

(57) ABSTRACT

An agricultural implement includes the use of one or more electromechanical hydraulic cylinder assembly in place of hydraulic cylinders. The assemblies may take various forms for actuation, and can convert an electric power source to hydraulic power for use on or with the implement. A control system is also provided for connecting to a tractor to provide control information to the assemblies or to a central hydraulic supply via a ISOBUS that rebroadcasts input controls from a source, such as a tractor used in conjunction with the agricultural implement.

15 Claims, 10 Drawing Sheets

(51) Int. Cl.
  *A01B 69/02* (2006.01)
  *A01B 73/00* (2006.01)
  *A01C 7/20* (2006.01)
  *F15B 15/20* (2006.01)
  *F15B 21/08* (2006.01)

(52) U.S. Cl.
  CPC ............ *F15B 15/18* (2013.01); *F15B 15/202* (2013.01); *F15B 21/085* (2013.01); *F15B 2211/20515* (2013.01); *F15B 2211/20546* (2013.01); *F15B 2211/20561* (2013.01); *F15B 2211/27* (2013.01); *F15B 2211/4053* (2013.01); *F15B 2211/615* (2013.01); *F15B 2211/625* (2013.01); *F15B 2211/6346* (2013.01)

(58) Field of Classification Search
  USPC ...................................... 56/10.2 R, 10.9, 11.9
  See application file for complete search history.

(56) References Cited

U.S. PATENT DOCUMENTS

| | | | | |
|---|---|---|---|---|
| 4,475,710 A * | 10/1984 | Leupers | ................ | F16K 31/124 251/30.01 |
| 4,627,235 A | 12/1986 | Kindermann | | |
| 4,738,315 A | 4/1988 | Kinzenbaw | | |
| 6,041,867 A * | 3/2000 | Orbach | ............... | A01B 63/1117 172/2 |
| 6,070,538 A * | 6/2000 | Flamme | ................ | A01B 79/005 111/170 |
| 7,188,680 B2 * | 3/2007 | Almen | ................. | A01B 59/042 111/69 |
| 7,281,372 B2 * | 10/2007 | Sakai | ........................ | F15B 1/26 60/434 |
| 8,162,070 B2 * | 4/2012 | Smith | .................... | G05D 19/02 172/2 |
| 8,626,408 B1 | 1/2014 | Satzler | | |
| 8,909,435 B2 * | 12/2014 | Tuttle | .................... | A01B 63/22 111/200 |
| 9,232,687 B2 * | 1/2016 | Bassett | ................ | A01B 61/044 |
| 9,282,688 B2 * | 3/2016 | Casper | .................. | H04N 7/183 |
| 9,360,005 B2 * | 6/2016 | Fedde | .................... | F04B 49/002 |
| 2003/0141132 A1 * | 7/2003 | Kowalyk | ........... | A01B 63/1013 180/306 |
| 2011/0202232 A1 * | 8/2011 | Busch | .................... | A01B 63/00 701/36 |
| 2013/0081830 A1 | 4/2013 | Tuttle et al. | | |
| 2015/0101322 A1 * | 4/2015 | Riskas | .................. | F15B 21/085 60/327 |
| 2015/0204354 A1 * | 7/2015 | Krittian | .................... | B60K 6/12 60/413 |
| 2015/0260204 A1 * | 9/2015 | Tanaka | ..................... | F15B 7/006 60/445 |
| 2016/0084271 A1 * | 3/2016 | Gomm | .................. | F15B 11/003 60/327 |
| 2016/0084276 A1 * | 3/2016 | Schaber | ................. | F15B 11/022 60/327 |
| 2016/0198623 A1 * | 7/2016 | Bassett | .................. | A01C 7/205 111/149 |

* cited by examiner

AGRICULTURAL IMPLEMENT WITH ELECTRO-HYDRAULIC CYLINDERS

CROSS-REFERENCE TO RELATED APPLICATIONS

This application claims priority under 35 U.S.C. § 119 of a provisional application Ser. No. 61/931,256, filed Jan. 24, 2014, which is hereby incorporated by reference in its entirety.

FIELD OF THE INVENTION

The invention relates generally to agricultural equipment. More particularly, but not exclusively, the invention relates to the use of electromechanical hydraulic cylinder assemblies with agricultural implements in place of hydraulic cylinders, as well as electromechanical hydraulic cylinder assemblies themselves.

BACKGROUND OF THE INVENTION

As the power of tractors and agricultural efficiency has increased, agricultural implements such as planters have increased in span, or width, to accommodate a larger number of individual row units. Planters generally include a main frame having a forward hitch assembly for drawing by a tractor and left and right wing sections pivotally attached to a portion of the main frame. The pivoting wing connections allow the wings to fold relative to the main frame for transport and storage of the planter.

An agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In addition, hydraulic lines may be strung across the planter to transfer high-density power from the tractor to the planter. Hydraulic systems are proven and efficient at taking that power and transferring it to agricultural mechanical systems. The planter may include a number of cylinders used to move components of the planter, as well as to maintain certain forces or pressure for the components. For example, a planter may have a hydraulically actuated marker on each wing of the planter. Hydraulic power, passed from the tractor, travels the entire length and width of the planter to the marker. The power is degraded through hoses, control blocks, and valves on its way to do work at the marker cylinder.

Therefore, while hydraulics may be ideal for providing power to the various cylinders of agricultural implements, there are some drawbacks. Due to the length of the hydraulic hoses and the number of hydraulically powered cylinders of an implement, much power can be lost during the transport of the hydraulic fluid through the hoses. Furthermore, the movement of the hydraulic fluid through the long length of hoses, as well as through all of the plurality of hoses requires a great deal of power, which must be supplied by the tractor.

Therefore, there is a need in the art for a cylinder assembly and an agricultural implement including the use of one or more of the cylinder assemblies that utilizes electric power from a tractor or other power source and converts it to a hydraulic power where it is needed in a simple and compact way and provides opportunity for integration with sensors and the planters electronic control systems.

SUMMARY OF THE INVENTION

It is therefore a principal object, feature, and/or advantage of the invention to overcome the deficiencies in the art.

It is another object, feature, and/or advantage of the invention to provide a cylinder assembly that includes a hydraulic source and that can be operated utilizing and electric power source to operate.

It is still another object, feature, and/or advantage of the invention to provide an agricultural implement that does not require the use of a single hydraulic source and hose system for all cylinders.

It is yet another object, feature, and/or advantage of the invention to provide an agricultural implement that includes the use of one or more electromechanical hydraulic cylinder assemblies.

It is a further object, feature, and/or advantage of the invention to provide an electromechanical hydraulic cylinder assembly that includes no hydraulic lines outside of the self-contained cylinder system.

It is yet a further object, feature, and/or advantage of the invention to provide a self-contained, electromechanical hydraulic cylinder assembly that is powered by an electric system of a tractor.

It is a further object, feature, and/or advantage of the invention to provide a self-contained, electromechanical hydraulic cylinder assembly that is powered by an external electric system, such as a generator.

It is still a further object, feature, and/or advantage of the invention to provide an electromechanical hydraulic cylinder assembly that includes an electric control unit and sensors to make the system an open loop or closed loop system.

These and/or other objects, features, and advantages of the invention will be apparent to those skilled in the art. The invention is not to be limited to or by these objects, features and advantages. No single embodiment need provide each and every object, feature, or advantage.

Aspects of the invention include the use of an electromechanical hydraulic pump and cylinder assembly. The assembly and/or assemblies can be used with agricultural implements in place of standard hydraulic cylinder systems. The assembly can include a cylinder comprising a ram including a piston capable of moving in a housing, a hydraulic fluid accumulator operatively connected to the cylinder and including hydraulic fluid, and an electric pump operatively connected to the accumulator to direct the hydraulic fluid from one side of the cylinder piston to the other to move the ram. An electric power source can be used to provide power to the assembly.

It is contemplated that the cylinder assembly of the invention be used with agricultural implements, in any number of ways. For example, the cylinder can replace existing systems that utilize hydraulic power and cylinders. Some aspects of the invention put an electromechanical hydraulic pump on the agricultural implement, such as at a planter marker. A pump of the assembly receives electrical power from the tractor that is efficiently transferred across the implement via electrical lines. The electromechanical pump mounted to the hydraulic cylinder converts the electrical power to hydraulic power; right at that the cylinder where it is needed. The pump moves hydraulic fluid through ports in the cylinder from one side of the cylinder piston to the other, thus actuating the cylinder to extend and retract it. No hydraulic lines exist outside the self-contained system. The electric motor speed can be controlled with an electronic control unit (ECU) and sensors to adjust the actuation of the cylinders. The ECU can receive instruction from the planter operator via the master electronic control system. The system could also be used for generally any hydraulically actuated implement systems, both linear and rotary.

Other hydraulic cylinders of the planter that may be replaced by the cylinders and cylinder assemblies of the invention include, but are not limited to, cylinders for providing downforce at the row units of a planter, cylinders for providing weight distribution of a planter, cylinders used for folding the wings of a planter, cylinders used for raising the wings of a planter, cylinders used to raise row units of a planter, or general replacement of any cylinder or cylinder assembly of a planter or other agricultural implement.

Other aspects and embodiments of the invention include other variations. For example, the hydraulically driven cylinders could also be replaced by electric cylinders, such as ball screw cylinders. These type of cylinders could be run solely on electric power, with the power operating the cylinder of the agricultural implement as needed in an open loop or closed loop control system. Other types of systems may include block and tackle type systems in which a plurality of fixed and movable pulleys is used to extend and retract the ram of the cylinder.

Figure 1:
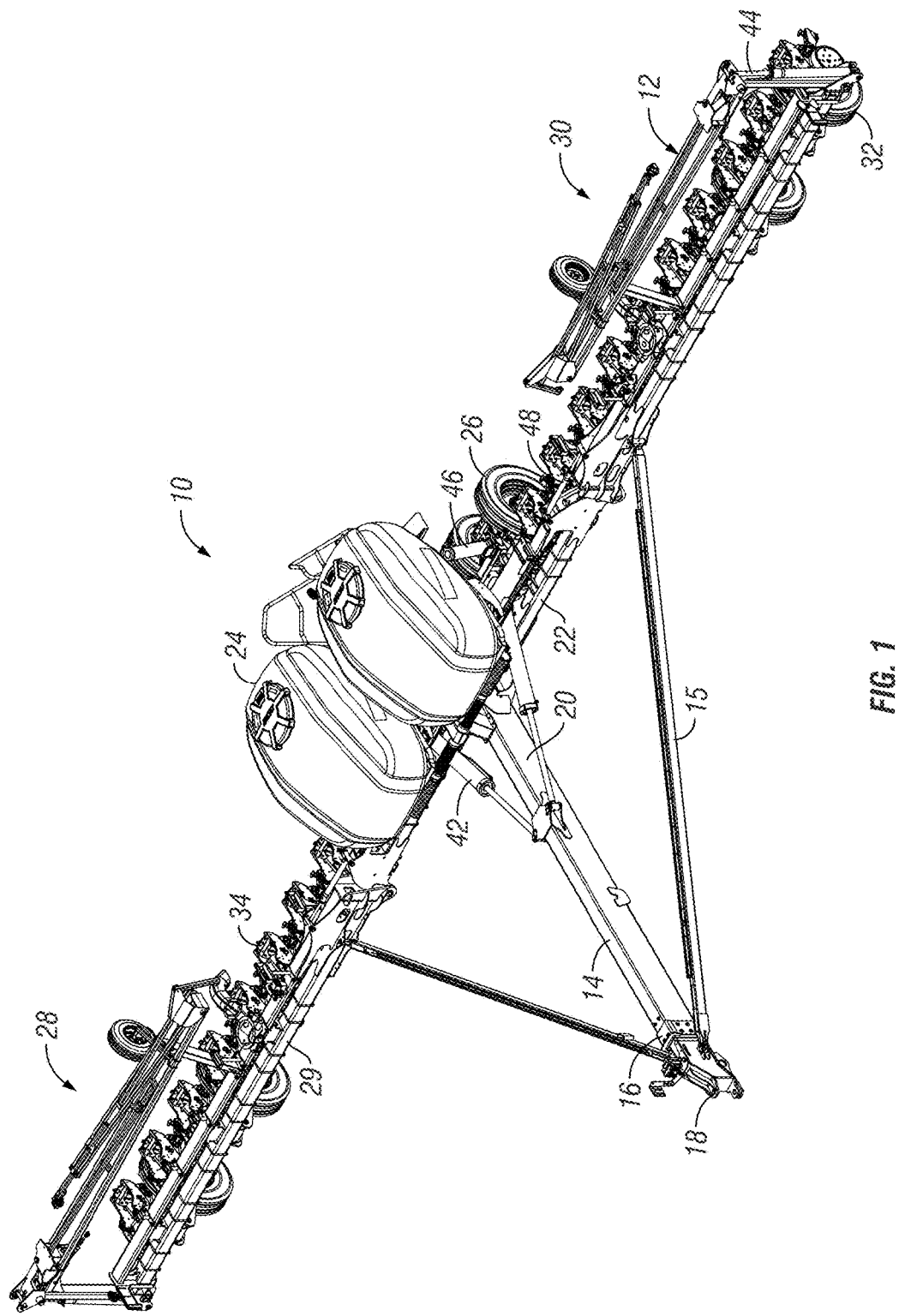
FIG. 1 is a perspective view of an agricultural planter implement.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 shows an exemplary embodiment of an agricultural implement 10, in this case, a planter for use with aspects of the present invention. The implement 10 may be a planter, fertilizer, or the like, and is usually attached to and pulled by a tractor. However, it should be appreciated that other equipment and/or vehicles may move the implement 10. For purposes of the present disclosure, the implement 10 will be referred to as a planter. The planter 10 includes a tongue 14 having a first end 16 and an opposite second end 20. The tongue 14 includes a hitch 18, with the hitch 18 being connectable to the tractor. At the second end 20 of the tongue 14 is a central tool bar 22. The tongue 14 may be a telescoping tongue with components capable of being inserted into one another such that the planter 10 is a front folding style implement. However, the present invention is not to be limited to such front folding style implements and is to include any such implement for use in the agricultural industry.

As shown in FIG. 1, the central hoppers 24 are positioned at the central toolbar 22. The hoppers 24 are configured to store seed, fertilizer, insecticide, or other types of material for use in farming. The use of the central hoppers 24 allows for a large amount of material to be added in a centralized location. However, the invention also contemplates the use of multiple hoppers positioned at each of the row units 34 of the planter 10. When central hoppers 24 are used at the central toolbar 22, it should be appreciated that the central hoppers will be in fluid communication with each of the row units 34. Also connected to the central toolbar 22 is a plurality of central wheels 26 extending generally downwardly from the central toolbar 22. The wheels contact the ground and support substantially all or most of the weight from the central hoppers 24. The wheels stabilize the implement 10 and are the general wheels that contact the ground when in a working position or a transport position, e.g., if the implement 10 is a front folding implement such that the wings 28, 30 are folded forward with wing wheels 32 not contacting the ground.

Extending generally from both sides of the toolbar 22 are first and second wings 28, 30. The wings 28, 30 are generally identical and mirror images of one another. Therefore, only one wing will be described with the knowledge that the other wing will be generally the same configuration. The first wing 28 includes a bar 29. Mounted to the bar 29 are a plurality of row units 34, as well as a plurality of wheels 32. The wheels 32 are configured to contact the ground. The row units 34 may include seed meters, fertilizers, insecticide sprayers, or other dispensers, discs, or plows. The wings 28, 30 may also include at least one fold cylinder 42 and a weight distribution cylinder 48. The fold cylinder(s) 42 is configured to fold the wings to a position wherein the first and second wings 28, 30 are generally adjacent the tongue 14 of the implement 10. Therefore, the fold cylinders 42 must be sufficiently strong enough to be able to move the wings. Furthermore, draft links 15 may extend between the tongue 14 and the wings 28, 30 to aid in supporting and folding of the wings.

The weight distribution cylinders 52 provide a force to press the wings downwardly, or the cylinders 52 may raise the wings to reduce ground contact pressure. The wings may need to be lifted during turning or during the folding of the wings. However, as the wings extend generally outwardly from the central toolbar 22, the wing down force may be required to ensure that the row units 34 penetrate the ground or remain substantially engaged with the ground. The planter may also include additional cylinders 46, which may lift and/or lower the planter, or even rotate the position of the central wheels 26.

The Figure also shows markers 12 connected to each of the wings 28, 30. The markers create an identifiable border to aid in traversing the field. The markers 12 may be selectively used such that a cylinder 44 is activated to raise and lower the marker 12 from the position shown in FIG. 1 to a position wherein the marker 12 is in contact or near contact with the ground.

Thus, as can be appreciated, there are numerous cylinders used with implements. The invention provides various cylinder assemblies that can replace the standard hydraulic cylinders that are commonly used with agricultural implements, by a replacement of some or all of the standard hydraulic cylinders, which may provide the benefits such as maintaining efficiency, removing the need for the number of hydraulic lines on an implement, utilizing electric power to operate the cylinders, as well as being able to have better control for the operation of the cylinders during use of the implement.

Figure 2:
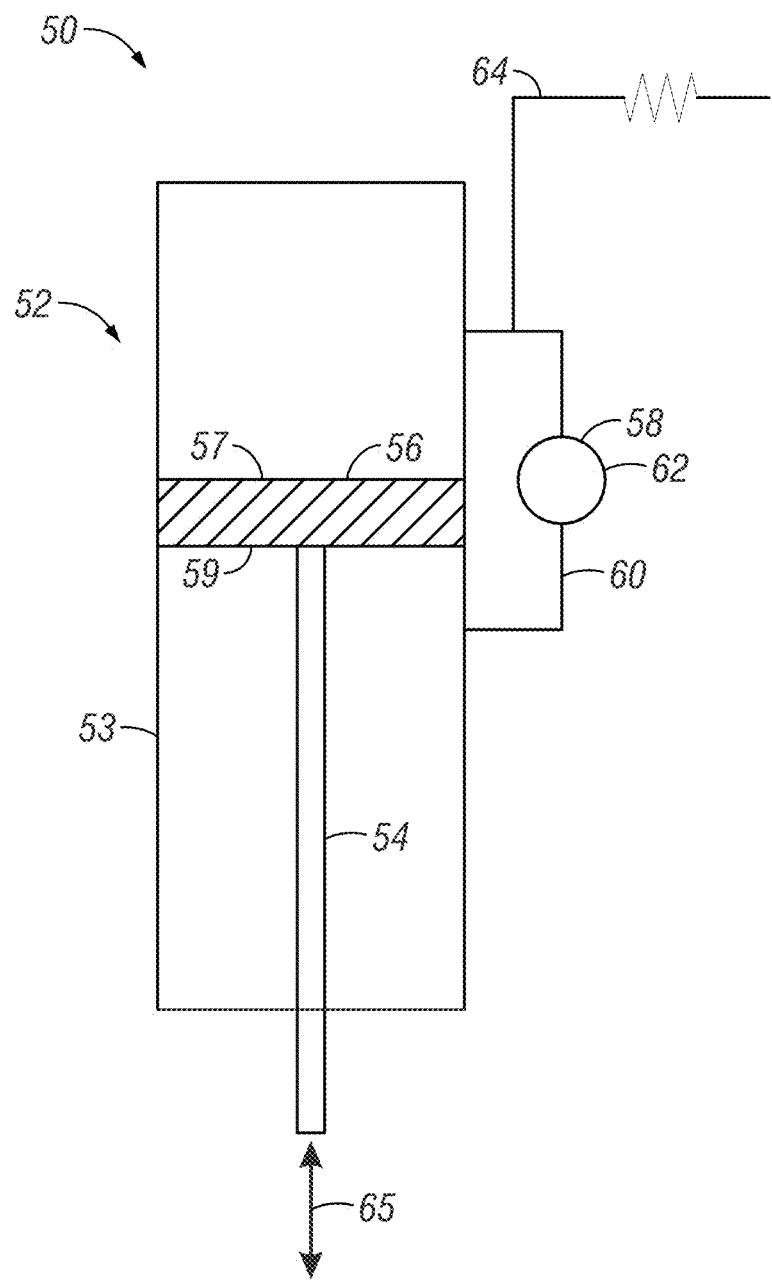
FIG. 2 is a schematic of an electromechanical hydraulic cylinder assembly according to aspects of the invention.

FIG. 2 is a schematic of an exemplary version of an electromechanical hydraulic cylinder assembly 50, which may be used with an agricultural implemental 10 according to embodiments of the invention. The cylinder assembly 50 as shown in FIG. 2 will allow for the replacement of standard hydraulic cylinders that are used with agricultural implements, as the assembly 50 is a substantially self-contained system that does not require hydraulic lines extending from a tractor or other central location to the location of the cylinder assembly 50. As shown in FIG. 2, the cylinder assembly 50 includes a cylinder 52 including a cylinder housing 53 for housing a ram 54 and piston 56. The ram 54 may be the output shaft of the cylinder 52 such that the movement of the ram 54 in the direction of the arrow 65 will operate or cause a function of the connected component. The piston 56 includes a first side 57 and second side 59. Operably attached to the cylinder 52 are a hydraulic accumulator 58 and an associated pump 62, which is an electric pump. The accumulator 58 may include a reservoir section for accumulating, storing, and/or temporarily holding an amount of hydraulic fluid. Furthermore, the pump 62 may be used to transport some of the said hydraulic fluid.

Furthermore, operably attached to the cylinder 52 and the accumulator 58 and/or pump 62 are hydraulic lines 60. The hydraulic lines 60 have outputs expending into the cylinder housing 53 on the opposite first and second sides 57, 59 of the piston 56. Therefore, the inclusion of the hydraulic fluid into the cylinder housing 53 on one of the sides of the piston 56 will provide a force acting on the side of the piston, which will cause the piston and ram to move in tandem in the associated direction. For example, when it is desired to extend the piston 56 and ram 54 in a generally downward direction as shown in FIG. 2, the pump 62 and/or accumulator 58 will operate to direct hydraulic fluid into the cylinder housing 53 at the first side 57 of the piston 56. The addition of the hydraulic fluid acting upon the first side 57 of the piston 56 will provide a force acting on the piston, which will cause the piston to move in a generally downward direction with respect to FIG. 2, which will in turn, cause the ram to move in the same direction. When the opposite is desired, i.e., the retraction of the ram 54 into the cylinder housing 53, the pump 62 can be activated to redirect the hydraulic fluid from the first side 57 of the piston 56, through the accumulator 58 and hydraulic lines 60 and into the cylinder housing 53, such that it acts on the on the second side 59 of the piston 56. The inclusion of the hydraulic fluid acting on the second side 59 of the piston 56 will cause the piston 56 to begin to move in a generally upward direction as shown in FIG. 2, which will retract the ram 54 into the cylinder housing 53 of the cylinder 52.

In addition, the pump 62 may be an electric pump such that it is powered by an electric power source. FIG. 2 shows that the cylinder assembly 50 includes an electric line 64 extending to the cylinder assembly 50. The electric power source 64 may be an electric line extending to the cylinder assembly 50 from a tractor power supply and/or separate power supply on the implement itself. For example, the power source may be a generator or other power source that is located on the implement, tractor, or other device. As the electric power is more efficient than moving hydraulic fluid the distance from the tractor to the location of the cylinder, the pump 62 receives electric power from the power source efficiently to the location of the cylinder assembly 50. The pump 62 moves the hydraulic fluid through ports in the cylinder housing 53 from one side of the cylinder piston to the other to actuate the cylinder to extend and retract it via the electric power. In other words, there are no hydraulic lines that exist outside of the self-contained cylinder assembly 50.

The invention also contemplates the use of regional pumps, as opposed to dedicated pumps for each assembly. For example, there could be a regional pump and or hydraulic fluid supply that is used for a region or area of the implement, such as for a number of row units of a planter, a wing of a planter, or some other arbitrary division. Said regional pump would control the hydraulic fluid supply for a number of cylinders that are located within the region. If the region includes six pumps of various sizes, the pump could be used to operate and control all of them at the same time. Furthermore, it is contemplated that pumps be used for all cylinders of a particular size or type. In such a scenario, the pumps could be configured to be able to handle the fluid for actuating a cylinder of certain size, including ram, piston, load capacity, etc. Therefore, the pumps could be best suited for the particular cylinders, without having to overload or underload certain pumps that may be controlling multiple sizes of cylinders.

The electric pump 62 can be controlled with an electric control unit (ECU) and sensors to adjust the actuation of the cylinder assembly 50 either automatically or upon an input from an operator. Thus, the invention contemplates that the assembly may be an open loop system in which the adjustment of the cylinder assembly 50 be automatically adjusted, or a closed loop system, in which the cylinder is adjusted based upon a user input. These inputs may be made at or within the tractor or otherwise via a user interface that is wired or wireless such that the adjustment of the cylinder assembly 50 may be made remotely from the location of the assembly 50.

Furthermore, as will be understood, the size, and thus power capability of the cylinder assembly 50 may be adjusted to accommodate generally any needed movement of the implement. As noted, the implement may include any number of cylinders performing a variety of tasks, which may require different power outputs. Therefore, it is contemplated that the size of the cylinder assembly 50, including the surface area of the sides of the piston 56 and the amount of hydraulic fluid used, may be adjusted to provide the required load output of the cylinder 52 at the desired location of the cylinder assembly 50. Therefore, variable sizes may be included of the cylinder assembly to accomplish the different tasks.

Figure 3:
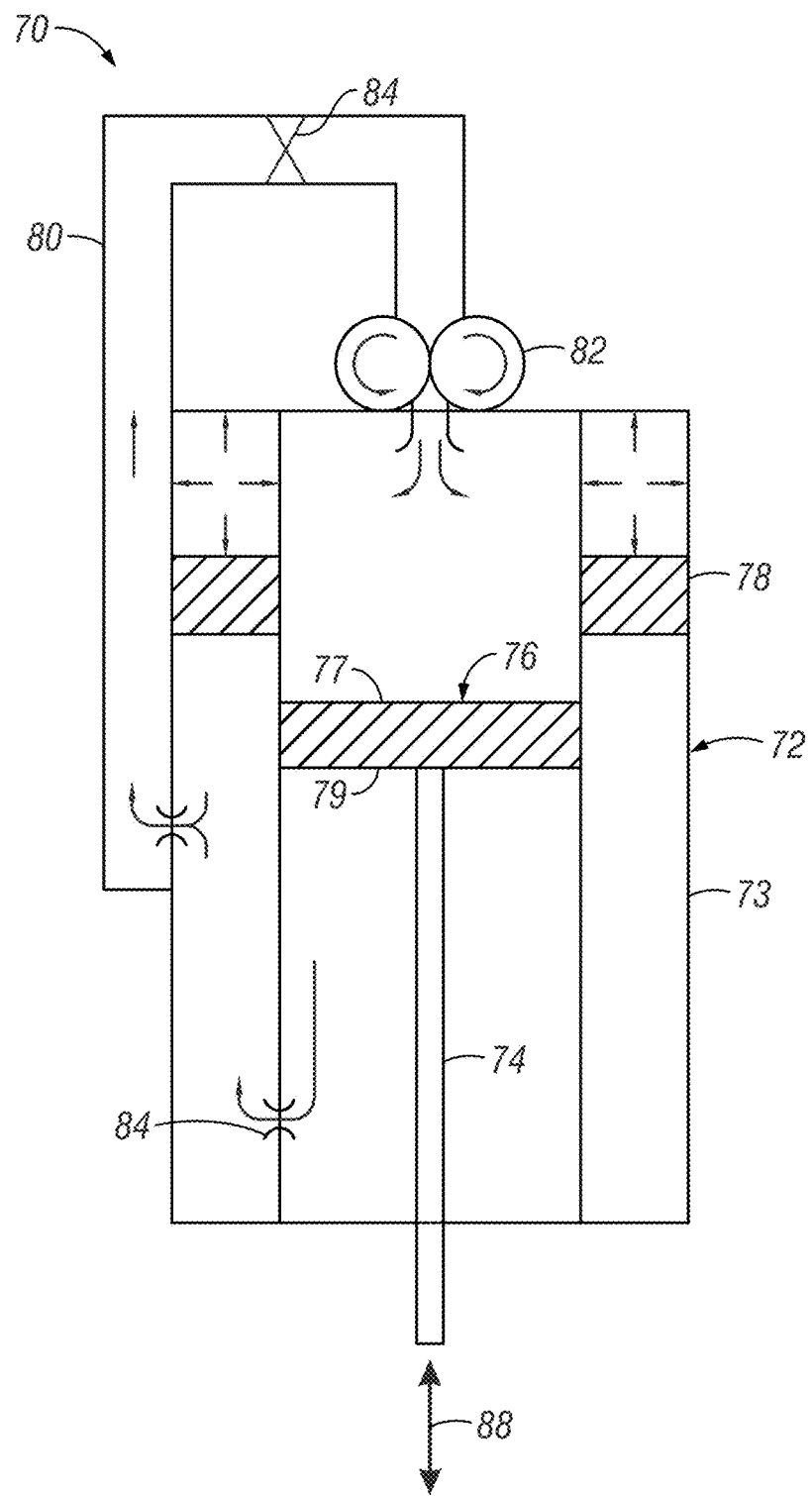
FIG. 3 is another schematic of an electromechanical hydraulic cylinder assembly.
Figure 4:
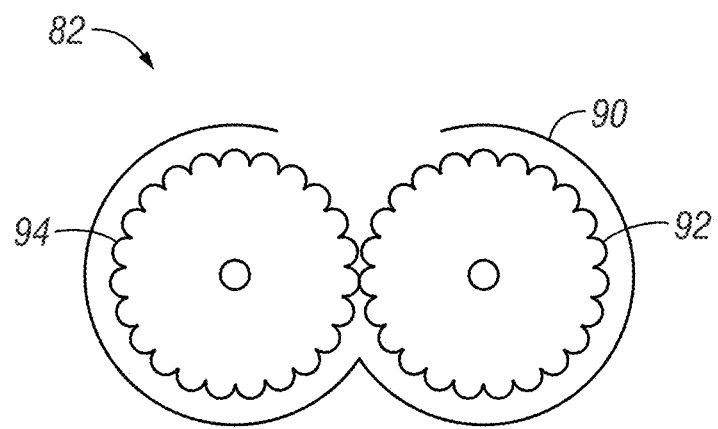
FIG. 4 is a schematic of a type of pump for use with the cylinder assembly of FIG. 3.
Figure 5:
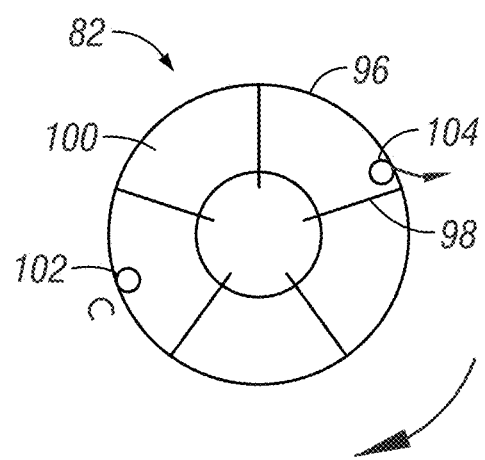
FIG. 5 is a schematic of another type of pump for use with the cylinder assembly of FIG. 3.

FIG. 3 shows another cylinder assembly 70 according to embodiments and/or aspects of the invention. Similar to the assembly 50 shown in FIG. 2, the assembly 70 of FIG. 3 includes a cylinder 72, which includes a housing 73 for housing and enclosing a ram 74 as well as a piston 76 attached to the ram 74, with the piston having a first side 77 and opposite second side 79. However, in the embodiment shown in FIG. 3, the housing 73 may include an accumulator ram 78, which may be a ring positioned within the wall or walls of the housing 73. Further components of the cylinder assembly 70 shown in FIG. 3 include hydraulic lines 80, an electric pump 82, lock valves 84, and/or check valves 86. The pump 82 may be any electric pump capable of moving hydraulic fluid from one side of the piston to the other and/or into the accumulator of the assembly 70. FIGS. 4 and 5 show some exemplary examples of electronic pumps for use with the cylinder assembly 70.

FIG. 4 shows a pump 82, which may be known as a gear pump 90. The gear pump 90 includes first and second gears 92, 94, which are used to rotate relative to each other to direct a selected amount of hydraulic fluid therethrough based upon a rotational direction of the first and second gears 92, 94. For example, when the first gear rotates in a clockwise direction, the second gear 94 will rotate in a counterclockwise direction. This will cause fluid to be moved from the first side of the piston 77 and through the hydraulic line 80 towards the second side 79 of the piston 76. However, the opposite rotation of the gears 92, 94 will cause the hydraulic fluid to be moved in the opposite direction, which will coincide with the force being applied to the first side 77 of the piston 76, which will extend the ram out of the cylinder housing 73. The gears may be sized and spaced such that a selected amount of hydraulic fluid is able to pass between the gears as they rotate relative to one another and towards their desired location. However, the gears can be locked such that no fluid is able to pass therethrough, when the cylinder assembly 70 is to be locked in place. Thus, the assembly 70 is capable of locking the ram 74 at a location to hold the length of the ram 74 constant.

FIG. 5 is another embodiment of an electric pump 82 for use with the cylinder assembly 70. The pump 82 shown in FIG. 5 may be known as a vane pump 96. The vane pump 96 includes vanes 98, a rotor 100, one or more suction ports 102, and one or more delivery ports 104. The rotation of the vanes 98 relative to the rotor 100 will cause the hydraulic fluid to be suctioned or delivered through the one of the ports to move the hydraulic fluid in a desired direction to activate the extension of retraction of the ram and piston combination. Furthermore, it is to be appreciated that other types of pumps may be included and used with the cylinder assembly 70 as well as other embodiments of the cylinder assemblies of the invention to accomplish the desired movement of the hydraulic fluid in the substantially self-contained electromechanical hydraulic cylinders of the invention.

Still further types of pumps, such as piston pumps, could be used for the electric pump. Piston pumps, which can be axial or radial, are types of positive displacement pumps where the high-pressure seal reciprocates with the piston. The piston pump could be used to move the hydraulic fluid from one side of the piston to the other, in order to actual the ram of the cylinder.

Referring back to FIG. 3, additional aspects will now be described. As mentioned, the housing 73 may include an accumulator ram 78, which may be a ring-like member that is movable within the walls of the cylinder housing 73. The hydraulic fluid is still directed to one of the first or second side 77, 79 of the piston 76 to apply a force thereon to actuate the movement of the piston, and therefore ram 74 to extend or retract the ram 74 in the direction generally shown by the arrow 88 in FIG. 3. However, the use of the accumulator ram 78 allows for additional benefits for the cylinder 70. The cylinder assembly 70 includes a plurality of lock valves 84 located along the path of the hydraulic fluid between the first and second sides 77, 79 of the piston 76. These lock valves can be activated to allow for the passage of the fluid in only one way, which will prevent the fluid from passing through in the opposite way. The lock valves 84 can hold the fluid in place to lock the ram in a fixed manner, such that the ram will not move. However, when only the lock valves of the hydraulic lines 80 are closed, and the lock valve between the interior of the cylinder 72 and the space of the walls of the cylinder housing 73 is open, this may allow for the ram to float, at least partially. For example, if the lower lock valve 84 shown in FIG. 3 is allowed to remain open, some fluid may pass into the cavity in the wall 73 of the cylinder housing 73. However, the fluid cannot retract into the hydraulic line 80 due to a lock valve being closed between the cavity and the line. The hydraulic fluid is able to move freely between the cavity in the cylinder housing walls and the interior of the cylinder 72 adjacent the side of the piston 76. This movement of the fluid wall allow the ram 74 and piston 76 have some movement, depending on the amount of fluid and amount of free space in the interior of the cylinder as well as the interior of the cavity of the cylinder walls. The floating of the ram 74 may be useful in some situations, such as in rough terrain of the implement, to allow for some give for a component of the implement such that the non-rigidity of the cylinder will mitigate damage to components of the implement. However, as the amount of float is limited due to the amount of free space in the cavities of the cylinder housing wall, the cylinder 72 will still be maintained in a primed position such that it will attempt to revert back to its original configuration.

Further features and/or benefits of a cylinder assembly 70 of the type shown in FIG. 3 may be as follows. The cylinder assembly 70 provides for positive pressure on the system at all times, which requires no pump cavitation. Furthermore, as the accumulator surrounds the cylinder 72 and is actually included as part of the cylinder housing 73, the cylinder assembly 70 requires or takes up minimal space such that it can be placed in any number of locations and/or configurations on or around the planter or other implement. Additional aspects include an electronic control module that is programmed to control the pump motor speed to control the extension and retraction of the ram 74 as required. However, an overload check valve 86 may be an optional addition or component of the cylinder assembly 70. The overload check valve 86 can be placed in or at the piston 76 to prevent or provide for one way flow of the hydraulic fluid. Furthermore, a magnet filter (not shown) may be included with the cylinder assembly 70 to provide for the filtration of the hydraulic fluid to aid in removing contaminants from the hydraulic fluid.

Figure 6A:
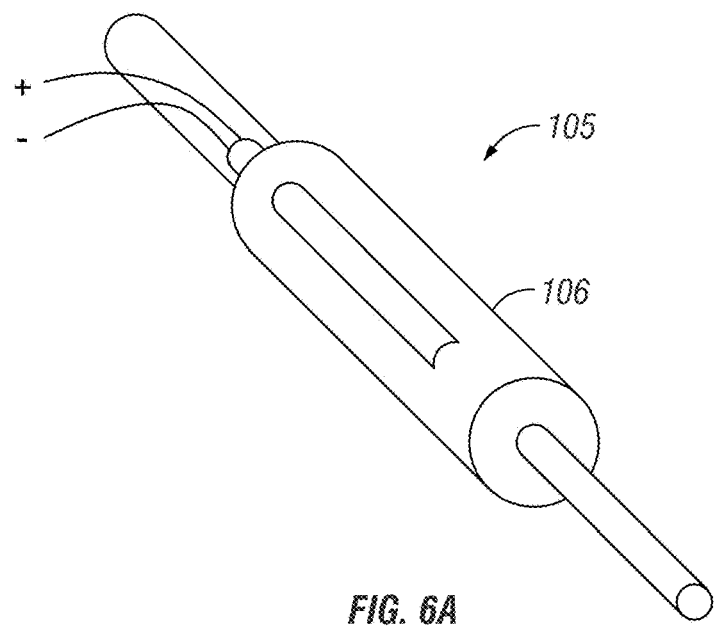
FIG. 6A is a perspective view of another electromechanical hydraulic cylinder assembly.
Figure 6B:
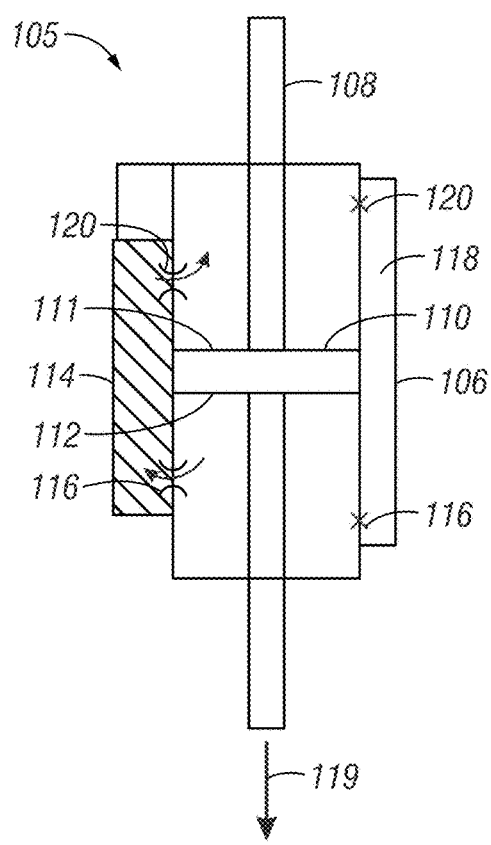
FIG. 6B is a sectional, schematic view of the electromechanical hydraulic cylinder assembly of FIG. 6A.

FIGS. 6A and 6B are perspective and sectional, schematic views of another electromechanical hydraulic cylinder assembly 105 according to aspects and/or embodiments of the invention. The cylinder assembly 105 shown in FIGS. 6A and 6B includes a two-way piston 110 and ram 108 assembly. The cylinder assembly 105 includes a cylinder housing 106 for housing the ram 108 and piston 110. In one of the walls of the cylinder housing 106 may be a channel 118, which may include apertures and block valves 116 or control valves 120 positioned in the apertures between the walls between the interior of the cylinder and the channel 118. Furthermore, the cylinder assembly 105 shown in FIGS. 6A and 6B includes an electric pump, which may be a screw-type pump 114 for transporting hydraulic fluid from a first side 111 of the piston 110 to and from the second side 112 of the piston 110. A screw-type pump 114 is an electronic pump that includes channels similar to an auger or worm gear. The rotation of the pump 114 can transport fluid between the auger teeth or gear teeth to move the fluid. Thus, the rotation of the screw-type pump 114 shown in FIG. 6B can move the hydraulic fluid from a first side 111 of the piston 110 to a second side 112 of the piston 110, which will result in the fluid providing a force on one of the sides of the piston 110, which will result in the movement of the piston and ram assembly in said direction. While the piston and ram assembly is shown to be a two-way ram in FIG. 6B, it should also be appreciated that the ram extend in only one direction from one of the sides of the piston 110, as has been shown heretofore, and still accomplish the same or similar results.

The cylinder assembly 105 provides a channel 118, which also may be the accumulator for the storage of the hydraulic fluid of the cylinder assembly 105. Furthermore, the channel 118 may be blocked or opened by the use of lock valves 116 or other control valves 120, such as check valves or ball valves. When the ram 108 is to be moved, for example, as in the direction of the arrow 119 shown in FIG. 6B, the hydraulic fluid is transported from the second side 112 of the piston 110 to the first side 111. The screw-type pump 114 may be electrically activated or powered to rotate, which will transport the fluid from the second side 112 to the first side 111 of the piston 110. The fluid, which passes through a valve, begins to exert a force on the first side 111 of the piston 110. This will cause the piston to move in the direction shown by the arrow 119, which will cause the ram to extend in the same direction as the arrow 119. Once the amount of extension of the ram 108 has taken place, the screw-type pump 114 can be stopped, and the valves at the pump 114 may be closed. However, lock, check, or other control valves 116, 120 between the interior of the cylinder housing 106 in the channel 118 may be left open to allow the ram 108 and cylinder assembly 105 to float within the cylinder housing 106. The float allows for some movements of the ram 108 and the piston 110 to account for needed movement of the implement in the field. However, when the ram 108 is to be locked, all the valves of the cylinder assembly 105 can be shut such that the ram 108 will not move relative to the cylinder housing 106.

There are numerous benefits of having a dynamically controlled electro-hydraulic cylinder, such as those heretofore shown and described. For example, the cylinders may include the elimination or mitigation of the leaks, frame space, energy loss, etc., associated with long hydraulic hoses, which are generally required for the standard hydraulic cylinders positioned at a location from a tractor or other hydraulic source. The use of the cylinders of the invention also eliminates or otherwise mitigates hydraulic fluid cross contamination via the tractor reservoir. As the fluid is passed from the cylinders to the tractor reservoir, the fluid may become contaminated, which reduces the efficiency of the fluid. Advanced filtration systems may be required, which may be costly and take up much needed space of the system. Thus, the cylinder assemblies of the invention provide for improved for liability for the cylinder outputs.

Further benefits and/or advantages include the ability to dynamically time cylinder movements via an electronic control module or units, which may also be known as an intelligent control. The intelligent control may be activated to precisely directly move the cylinder rams via the precise movement of hydraulic fluid from one side of the piston to the other side of the piston in the substantially self-contained cylinder assemblies. Furthermore, the assemblies may be connected to an electronic control unit via open or closed loop systems, wherein the systems are automatically adjusted or otherwise adjusted via operator inputs. The invention is not to be limited to one specific type of system. The use of the cylinders of the invention provide for movement feedback that can be simply and quickly monitored through an encoder in the motor of the cylinder assemblies, to provide better feedback to an operator of the implement via directly or remotely via the use of wired or wireless technology. For example, the cylinder assemblies may continuously update user displays either wired to a tractor such that the operator is in the cab of the tractor, or may be wireless such that the signals and/or data of the cylinder assemblies may be automatically transported wirelessly to tablets, phones, or other computing systems of an operator at any remote location.

The cylinders also allow for modular field repair, replacement, or swapping, which may allow for different sized/load capable cylinder assemblies can be swapped to provide for varying amounts of load output based upon the need of the cylinder assembly. As the cylinders are substantially self-contained units, there is no need to crack hydraulic lines and prime the system. The cylinder assemblies shown and described herein may simply be swapped out when the replacement is needed, such as due to age, repair, or other issues. Other benefits include more consistent operation over temperature extremes, as the system will be self-contained.

As mentioned, the cylinder assemblies of the invention may be controlled via open and/or closed loop systems. The user or operator may input to a display or other system to extend a ram, retract a ram, lock the cylinders, or allow float of a cylinder assembly or a plurality of cylinder assemblies. The user may also control the flow speed of the hydraulic fluid, delay time, or on or off duration thereof. Furthermore, the invention contemplates the use of an electronic control module logic for controlling the cylinder assemblies. The control module may utilize the user input or utilize a closed or an open loop system in which external data is obtained and maintained to determine the proper operation of a particular or plurality of cylinders. The control module can adjust the motor and flow valves to achieve a desired movement. For example, a lower, slow flow rate may be required opening the flow valves, and no motor input may be required at all. Other benefits and advantages obvious to those skilled in the art may be appreciated and contemplated.

Figure 7:
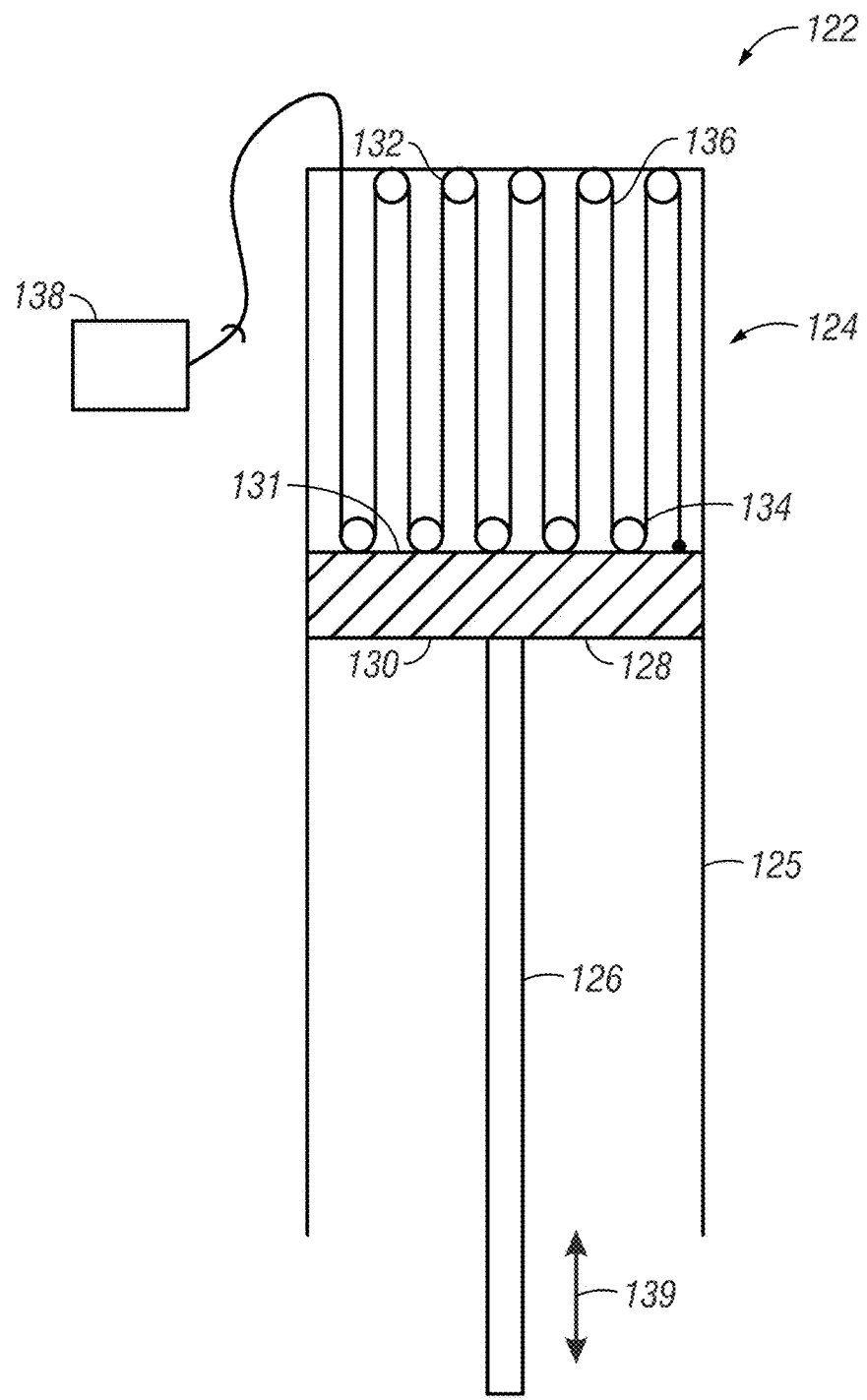
FIG. 7 is a view of another cylinder assembly.

Additional cylinder assemblies and functions are also contemplated by the invention. For example, FIG. 7 is a schematic of another cylinder assembly 122, which eliminates the need for hydraulic fluid. The assembly 122 shown in FIG. 7 incorporates the use of a block and tackle-type piston to provide for movement of a ram 126. The cylinder assembly 122 shown in FIG. 7 includes a cylinder 124 having a cylinder housing 125 for enclosing a ram 126 and piston 128. The piston 128 includes a first side 130 and an opposite second side 131. The ram 126 extends from the first side 130 of the piston 128. However, it should be appreciated that the ram may extend from either side of the piston, and may also be a two-way ram that extends from both sides of the piston 128.

Shown on the second side 131 of the piston 128 are a plurality of fixed pulleys 132 and a plurality of movable pulleys 134. A line 136 extends through, around, and between the fixed and movable pulleys 132, 134. The fixed pulleys 132 are fixed to the cylinder housing 125, while the movable pulleys 134 are connected to the second side 131 of the piston 128. Movement or adjustment of the line 136, such as via a winder motor 138 or other motor, will cause the piston 128 and ram 126 assembly to move depending on the movement of the line. For example, when the line 136 is retracted via the motor 138, the movable pulleys 134 will move towards the fixed pulleys 132 such that the ram 126 is retracted into the cylinder housing 125. However, when the line 136 is released, the ram 126 will begin to extend from the cylinder housing 125. Thus, the movement of the ram 126 will be in the direction generally shown by the arrow 139 of FIG. 7. The cylinder 124, including the plurality of pulleys 132, 134, will provide generally linear motion via the use of the winder motor 138 and pulleys 132, 134.

Other types of cylinders may also be used and can be considered part of the invention. For example, the invention contemplates the use of internal combustion cylinders for use with agricultural implements. The internal combustion cylinders include a free piston engine to charge the piston. The combustion will cause the piston to move in a manner such that it will extend or retract a ram connected to the piston. Such a cylinder may be better used for situations in which the cylinder is infrequently used, however, it could also be used with an accumulator to provide for additional power in certain situations in which the cylinder is required to move a heavier load or required to have more force.

Still other type of cylinders may include ball screw cylinders for use with an agricultural implement. A ball screw cylinder includes the use of a low or zero friction screw attached to a shaft. The screw is rotated about the shaft to push or pull a piston, which may be extended to a ram. The ball screw may be beneficial as it is capable of very high loads such that greater loads can be moved via the ball screw cylinder on or at the agricultural implement.

Still other types of cylinders may be solenoids, regenerative cylinders, and electro motion cylinders, which may include dynamic moving magnets. For example, an electric motor or hydraulic pump portion of the cylinder can be driven in reverse such that it is similar to regenerative braking. The reverse movement of the hydraulic pump will drive an electric generator. Such a situation could be used with the planter at the cylinder, wheel, or pump that is working against gravity or a source of significant momentum such that it is capable of regeneration. Some examples include lowering the planter tool bar, slowing the planter speed, and/or lowering a row marker. However, other exemplary aspects may be included.

Figure 8:
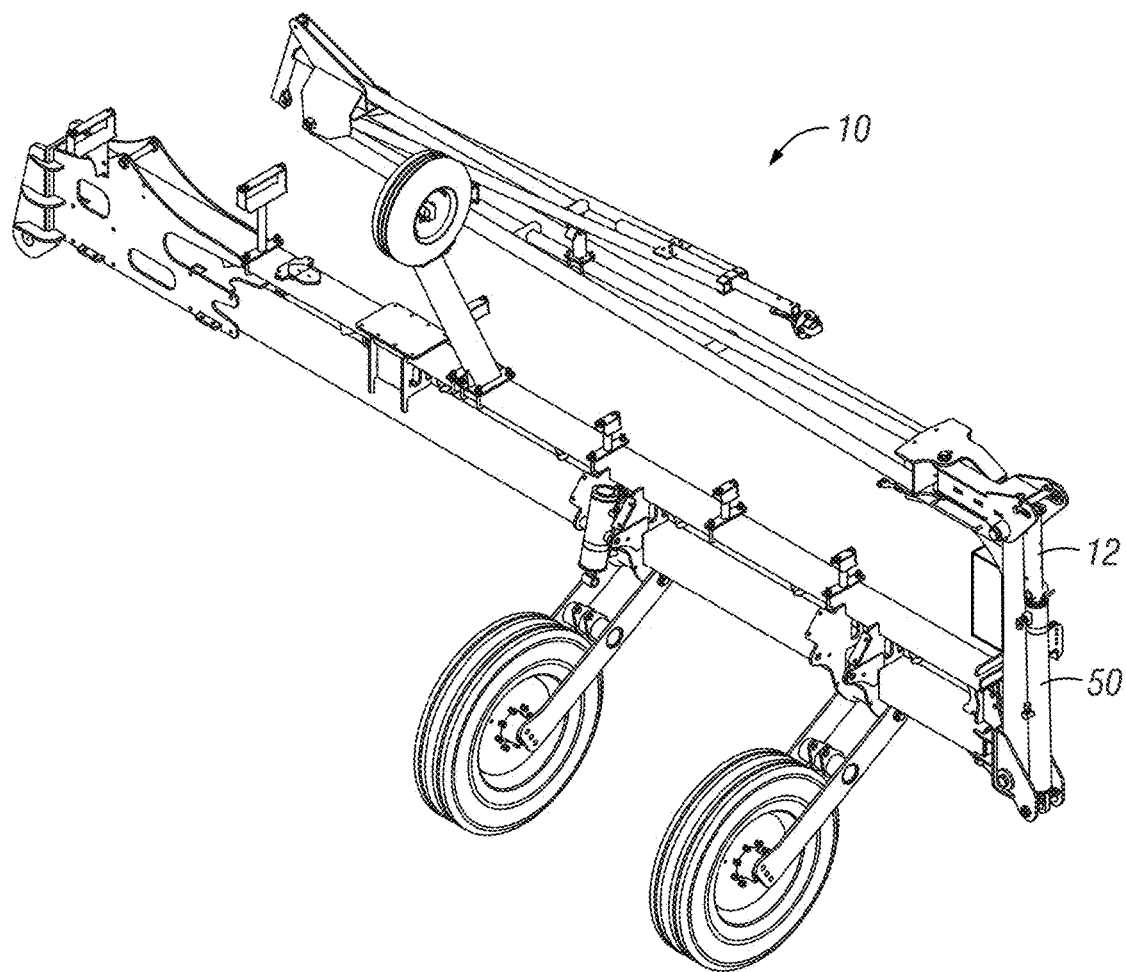
FIG. 8 is a view of a wing of a planter including an electromechanical hydraulic cylinder assembly attached to a marker for the planter.

FIG. 8 is a view of a wing of a planter 10 including an electrohydraulic cylinder assembly 50 attached to a marker 12 of the planter 10. As mentioned, the cylinder assemblies herein disclosed may be used to replace generally any cylinder of an agricultural implement, such as a planter. For exemplary purposes, however, the replacement of a cylinder assembly used for raising and lowering a planter marker 12 will be described. A planter 10 has a hydraulically actuated on each marker 12 on each wing of the planter 10. The hydraulic power required to activate a hydraulically powered cylinder assembly must travel the entire length and width of the planter to reach the marker 12. Thus, this power is degraded through hoses, control blocks, and valves on its way to do the work at the marker cylinder. The use of the substantially self-contained electrohydraulic cylinder assembly 50 of the invention puts a pump on the marker cylinder. The pump of the assembly receives electrical power from the tractor, which is efficiently transferred across the planter to the cylinder assembly 50. The pump 62 mounted with the cylinder 52 converts the electric power to hydraulic power, right at the cylinder 52 where it is needed. The pump 62 can move the hydraulic fluid through ports in the cylinder 52 from one side of the piston 56 to the other, thus actuating the cylinder 52 to extend and/or track the ram 54 thereof. Therefore, no hydraulic lines exist outside of the self-contained cylinder assembly 50. The electric motor speed can be controlled with an electronic control module or unit and sensors to adjust the actuation of the markers 12 to raise and lower said markers. The electronic control unit can receive instruction from the planter operator via a master electronic control system, or it can be automatically controlled via another intelligent control. However, the cylinder assembly 50 could also include an integrated intelligent control as well. In addition, the cylinder assembly 50 could be used for generally any hydraulically actuated planter system, both linear and rotary.

Thus, the reduction and/or elimination of the hydraulic hoses will provide a more organized looking planter or other agricultural implement, while also providing a more efficient cylinder assembly such as the electric power transported to the cylinder assembly may be transported in a more efficient manner than that of a hydraulic powered system requiring hydraulic fluid to be transported from a tractor to the location of a hydraulic cylinder assembly.

Figure 9:
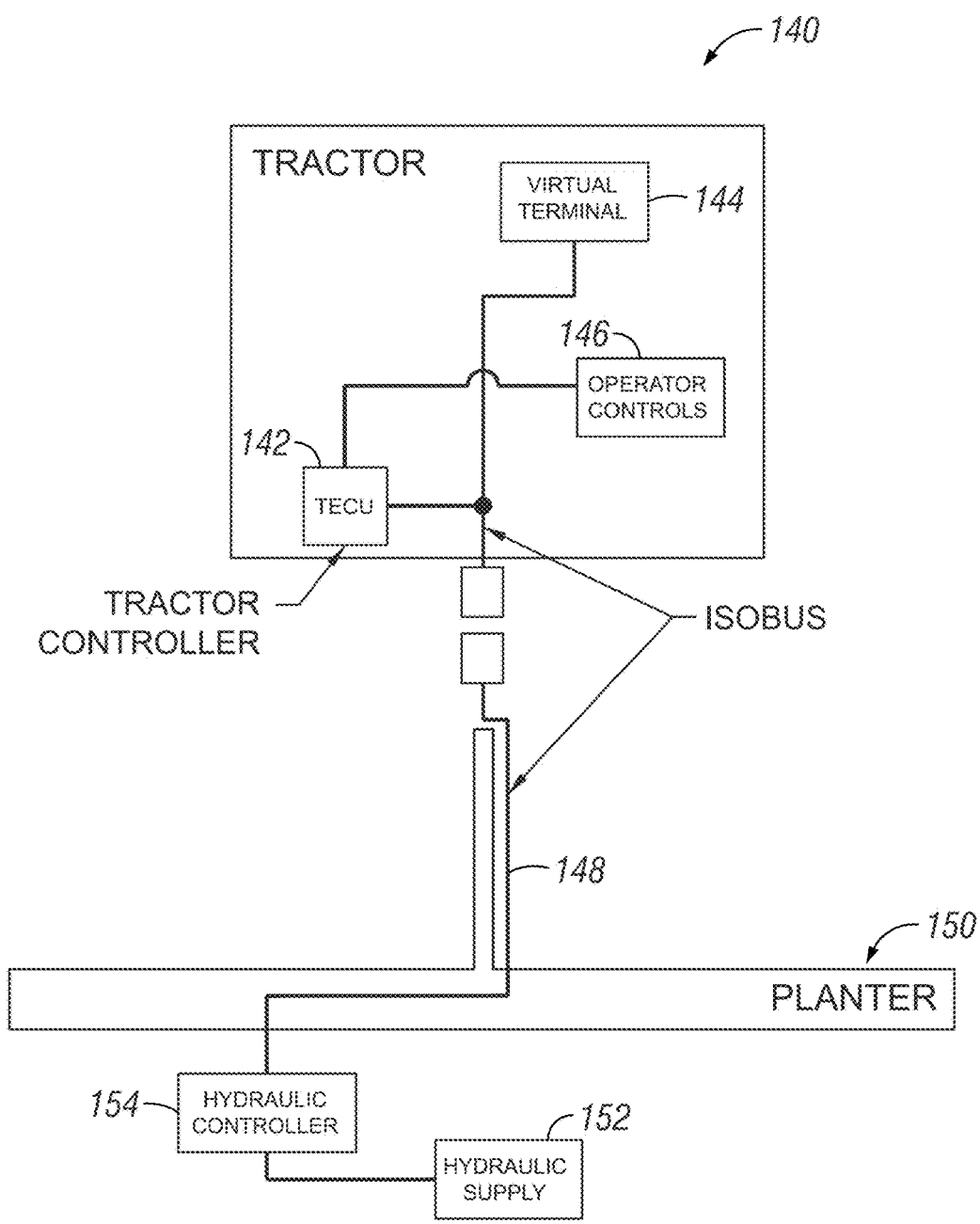
FIG. 9 is a schematic view of a centralized hydraulic power pack attached to a planting implement.
Figure 10:
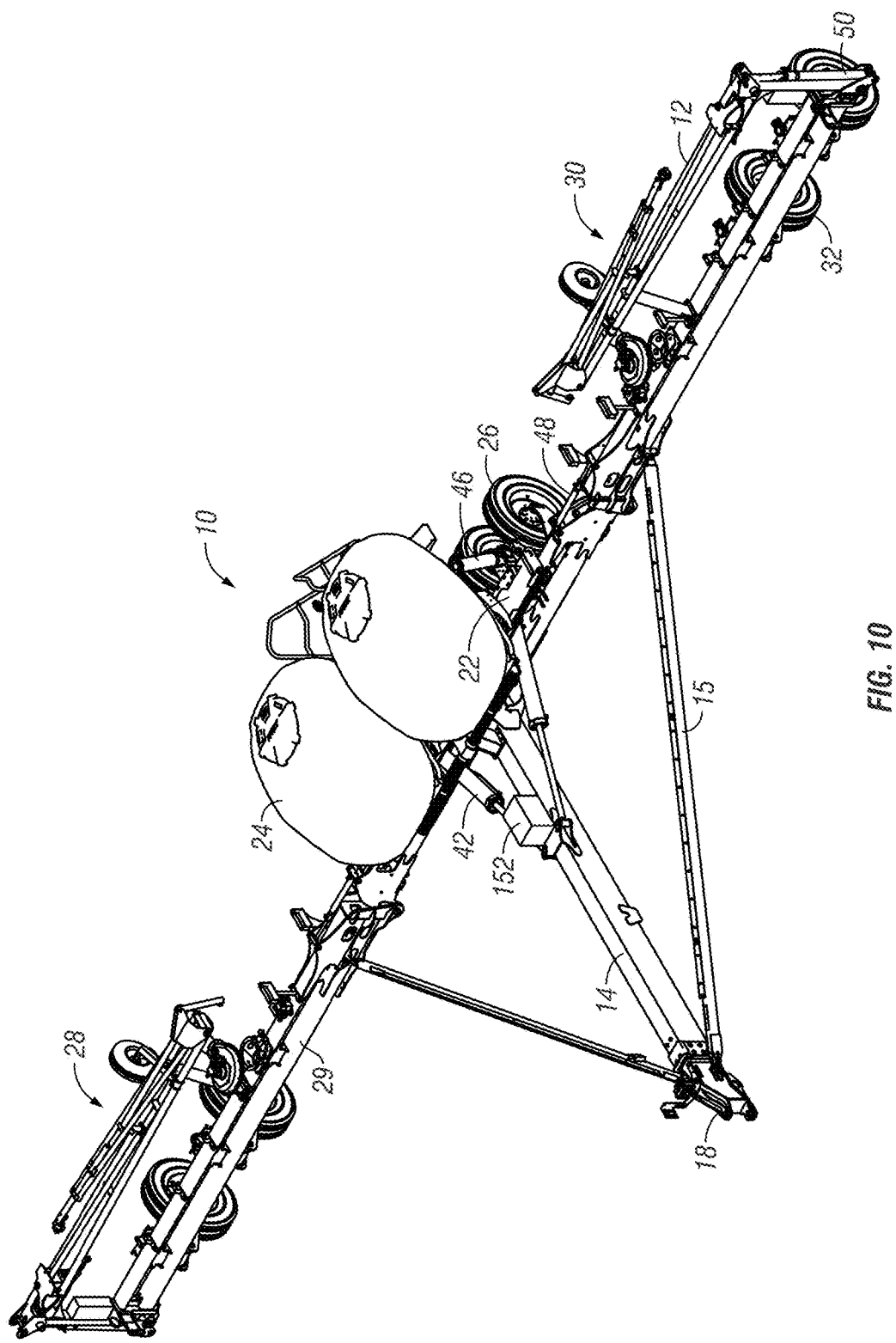
FIG. 10 is perspective view of a planting implement with a hydraulic power pack positioned thereon.

FIGS. 9 and 10 are perspective and schematic views of a centralized hydraulic power pack and system for controlling thereof for use with a tractor and implement including substantially self-contained cylinder assemblies. As shown in FIG. 10, a hydraulic supply 152 may be positioned on the planter tongue 14 or otherwise attached to the central frame or toolbar 22 of the planter 10. The hydraulic supply could be a dedicated reservoir of hydraulic fluid and can include other control mechanisms to directly provide hydraulic or electrohydraulic cylinder assemblies with hydraulic fluid to actuate the cylinders thereof.

To control a centralized hydraulic power pack 152, as is shown in the figures, FIG. 9 provides a schematic system. A tractor 140 includes a tractor controller 142, which may be a tractor electric control unit (TECU). The tractor controls, which may include a display or virtual terminal 144, as well as operator controls or user interfaces 146, feed into the tractor controller 142. The tractor controller 142 hooks up to the ISOBUS, which rebroadcasts the tractor control messages on the bus. The ISOBUS, which is shown as numeral 148 in FIG. 9, is a communication protocol for the agriculture industry based on the SAE J1939 protocol (which includes CANbus). The planter hydraulic control unit 154 of the planter 150 picks up on these commands and actuates valves to run functions on the planter 150 as if they were hooked directly to the tractor 140. For example, the valves may be included within the hydraulic supply unit 152, which is shown in FIG. 11.

Figure 11:
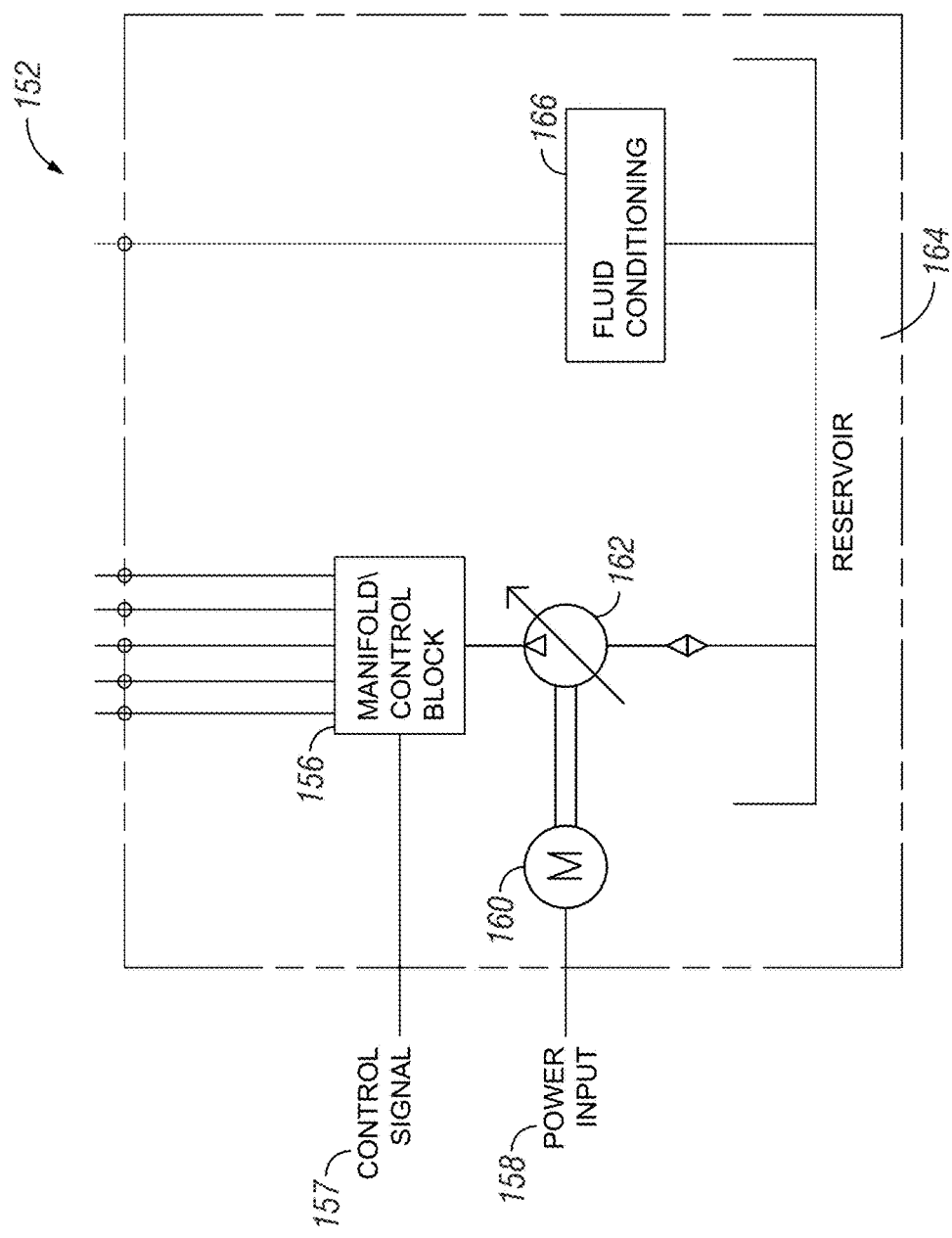
FIG. 11 is a schematic view of the hydraulic power pack of FIG. 10.

FIG. 11 shows a hydraulic supply unit 152 including a manifold or control block 156, power input 158 connecting to an electric motor 160 and pump 162, a reservoir for holding a supply of hydraulic fluid 164, and a fluid conditioning component 166. As mentioned, the ISOBUS 148 rebroadcasts inputs of the tractor controls 144, 146, which have been sent via the tractor control unit 142. These are picked up by the hydraulic controller 154, which is positioned on the planter 150 and is operably connected to the hydraulic supply unit 152. The hydraulic control unit 154 provides commands to the supply unit 152. For example, it may control the control block 156 via a control signal 157 to provide an amount of hydraulic fluid from the reservoir 164 to a specific location. The power input 158 actuates an electric motor 160, which controls a pump 162 to direct the hydraulic fluid from the reservoir 164 through the control block 156 and towards the end location for use of the hydraulic fluid. Upon return, the hydraulic fluid is directed through a fluid conditioning member 166, which can clean or otherwise filter the hydraulic fluid before returning it to the reservoir 164 for future use. Thus, the centralized hydraulic supply unit or pack, which is positioned on the planter 150, can actuate such that the hydraulic fluid is not controlled and supplied by the tractor itself. Thus, the system shown in FIGS. 9-11 provide a situation in which the hydraulic fluid is located at a closer location to the end use location for the fluid, such that there is less loss in hydraulic power by the time the fluid reaches the cylinder for end use. In addition, having the fluid conditioning member 166 at the centralized location also provides that the hydraulic fluid can be filtered or otherwise cleaned of contaminants such that the hydraulic fluid can be reused to provide for longer times between having to replace the hydraulic fluid of the hydraulic supply unit 152.

Thus, as has been disclosed, the invention provides numerous variations, embodiments, and other aspects of alternative cylinder assemblies for use with agricultural implements. Some aspects include the use of substantially self-contained units that are not dependent upon a tractor for hydraulic supply. Such self-contained units can be modular and otherwise electrically controlled to provide for use at specific locations of a planter or other agricultural implement. One skilled in the art will greatly appreciate the benefits, aspects, and other advantages of such systems, and will also understand that there are various modifications that may be made to the exemplary aspects shown and described, while also being part of the scope of the invention.

What is claimed is:

1. A system comprising:
   an electromechanical hydraulic cylinder assembly comprising:
      a cylinder comprising a ram including a piston capable of moving in a housing;
      a hydraulic fluid accumulator operatively connected to the cylinder and including hydraulic fluid; and
      an electric pump operatively connected to the accumulator to direct the hydraulic fluid from one side of the cylinder piston to the other to move the ram;
   a hydraulic cylinder assembly comprising at least one hydraulic cylinder connected to a common hydraulic reservoir remote of the at least one hydraulic cylinder to provide for operation of the at least one hydraulic cylinder, wherein the hydraulic cylinder assembly is positioned on an agricultural implement to provide movement for one or more components of the agricultural implement;
   wherein the electromechanical hydraulic cylinder assembly includes an electronic control unit and the electromechanical hydraulic cylinder assembly is positioned on the agricultural implement to provide movement for one or more different components of the agricultural implement.

2. The system of claim 1, further comprising an electric power source connected to the pump to provide power thereto.

3. The system of claim 1, wherein the electric pump comprises an electric gear pump.

4. The system of claim 1, wherein the electric pump comprises a vane pump.

5. The system of claim 1, wherein the electric pump comprises a screw-type pump.

6. The system of claim 1, further comprising one or more lock valves operatively connected to the electromechanical hydraulic cylinder assembly.

7. The system of claim 6, wherein the one or more lock valves include a closed position in which the ram is prevented from moving and an open position in which the ram is allowed to float within the housing.

8. The system of claim 1, further comprising an intelligent control for operating the pump of the electromechanical hydraulic cylinder assembly to control the movement of the ram.

9. The system of claim 8, wherein the intelligent control comprises a closed loop system in which the cylinder assembly is adjusted based upon a user input.

10. The system of claim 8, wherein the intelligent control comprises an open loop system in which the electromechanical hydraulic cylinder assembly is automatically adjusted.

11. An agricultural implement, comprising:
    a tongue;
    a frame extending from an end of the tongue and including a plurality of row units;
    first and second markers extending from opposite ends of the frame; and
    an electromechanical hydraulic cylinder assembly operatively connected to each of the markers for extending and retracting the markers relative to the frame, the electromechanical hydraulic cylinder assembly comprising:
       a. a cylinder comprising a ram including a piston capable of moving in a housing;
       b. a hydraulic fluid accumulator operatively connected to the cylinder and including hydraulic fluid;
       c. an electric pump operatively connected to the accumulator to direct the hydraulic fluid from one side of the cylinder piston to the other to move the ram; and
       d. an electric control unit operatively connected to the agricultural implement to operate the cylinder assembly manually or automatically; and
    a hydraulic cylinder assembly comprising at least one hydraulic cylinder connected to a common hydraulic reservoir remote of the at least one hydraulic cylinder to provide for operation of the at least one hydraulic cylinder, wherein the hydraulic cylinder assembly is positioned on the agricultural implement to provide movement for one or more components of the agricultural implement.

12. The implement of claim 11, further comprising an electric power source to power the electromechanical hydraulic cylinder assembly.

13. The implement of claim 12, wherein the power source comprises a power source of a tractor connected to the implement to provide power to the electromechanical hydraulic cylinder assembly.

14. The implement of claim 11, wherein the pump comprises:
    a. an electric gear pump;
    b. an electric vane pump; or
    c. an electric screw-type pump.

15. The implement of claim 11, wherein the cylinder assembly comprises one or more lock valves having a closed position in which the ram is prevented from moving and an open position in which the ram is allowed to float within the housing.

* * * * *